(12) United States Patent
Maugans et al.

(10) Patent No.: US 6,194,532 B1
(45) Date of Patent: Feb. 27, 2001

(54) ELASTIC FIBERS

(75) Inventors: Rexford A. Maugans; Edward N. Knickerbocker; George W. Knight, all of Lake Jackson, TX (US)

(73) Assignee: The Dow Chemical Company, Midland, MI (US)

( * ) Notice: Subject to any disclaimer, the term of this patent is extended or adjusted under 35 U.S.C. 154(b) by 750 days.

(21) Appl. No.: 08/650,577

(22) Filed: May 20, 1996

Related U.S. Application Data

(63) Continuation of application No. 08/339,533, filed on Nov. 15, 1994, now abandoned, which is a continuation of application No. 08/053,580, filed on Apr. 27, 1993, now abandoned, and a continuation-in-part of application No. 08/370,051, filed on Jan. 9, 1995, now Pat. No. 5,525,695, which is a division of application No. 08/044,426, filed on Apr. 7, 1993, now Pat. No. 5,380,810, which is a division of application No. 07/776,130, filed on Oct. 15, 1991, now Pat. No. 5,272,236, and a continuation-in-part of application No. 08/452,249, filed on May 26, 1995, now abandoned, which is a division of application No. 08/312,013, filed on Sep. 23, 1994, now abandoned, which is a continuation of application No. 08/166,497, filed on Dec. 13, 1993, now abandoned, which is a division of application No. 07/939,281, filed on Sep. 2, 1992, now Pat. No. 5,278,272, which is a continuation-in-part of application No. 07/776,130, filed on Oct. 15, 1991, now Pat. No. 5,272,236.

(51) Int. Cl.[7] .................................................... C08F 10/00
(52) U.S. Cl. .................... 526/348; 526/348.1; 526/348.6
(58) Field of Search ................................ 526/348, 348.1, 526/348.6

(56) References Cited

U.S. PATENT DOCUMENTS

| | | |
|---|---|---|
| 2,957,512 | 10/1960 | Wade et al. . |
| 3,485,706 | 12/1969 | Evans . |
| 3,645,992 | 2/1972 | Elston . |
| 3,678,134 | 7/1972 | Middlebrook . |
| 3,949,128 | 4/1976 | Ostermeier . |
| 4,076,698 | 2/1978 | Anderson et al. . |
| 4,181,762 | 1/1980 | Benedyk . |
| 4,197,377 | 4/1980 | Bohm et al. . |
| 4,209,563 | 6/1980 | Sisson . |
| 4,250,273 | 2/1981 | Bohm et al. . |
| 4,281,689 | 8/1981 | Benedyk . |
| 4,296,163 | 10/1981 | Emi et al. . |
| 4,322,027 | 3/1982 | Reba . |
| 4,323,534 | 4/1982 | DesMarais . |
| 4,340,563 | 7/1982 | Appel et al. . |
| 4,381,781 | 5/1983 | Sciaraffa et al. . |
| 4,413,110 | 11/1983 | Kavesh et al. . |
| 4,425,393 | 1/1984 | Benedyk et al. . |
| 4,426,420 | 1/1984 | Likhyani . |
| 4,450,026 | 5/1984 | Pieniak et al. . |
| 4,477,516 | 10/1984 | Sugihara et al. . |
| 4,486,552 | 12/1984 | Niemann . |
| 4,543,099 | 9/1985 | Bunnelle et al. . |
| 4,578,414 | 3/1986 | Sawyer et al. . |
| 4,584,347 | 4/1986 | Harpel et al. . |
| 4,644,045 | 2/1987 | Fowells . |
| 4,652,487 | 3/1987 | Morman . |
| 4,655,760 | 4/1987 | Morman et al. . |
| 4,657,802 | 4/1987 | Morman . |
| 4,663,220 | 5/1987 | Wisneski et al. . |
| 4,663,221 | 5/1987 | Makimura et al. . |
| 4,668,566 | 5/1987 | Braun . |
| 4,707,398 | 11/1987 | Boggs . |
| 4,719,261 | 1/1988 | Bunnelle et al. . |
| 4,720,415 | 1/1988 | Vander Wielen et al. . |
| 4,724,184 | 2/1988 | Killian et al. . |
| 4,734,311 | 3/1988 | Sokolowski . |
| 4,741,949 | 5/1988 | Morman et al. . |
| 4,775,579 | 10/1988 | Hagy et al. . |
| 4,777,080 | 10/1988 | Harris, Jr. et al. . |
| 4,781,966 | 11/1988 | Taylor . |
| 4,789,699 | 12/1988 | Kieffer et al. . |
| 4,801,482 | 1/1989 | Goggans et al. . |
| 4,803,117 | 2/1989 | Daponte . |
| 4,804,577 | 2/1989 | Hazelton et al. . |
| 4,818,597 | 4/1989 | DaPonte et al. . |
| 4,820,572 | 4/1989 | Killian et al. . |
| 4,830,907 | 5/1989 | Sawyer et al. . |
| 4,833,012 | 5/1989 | Makimura et al. . |
| 4,835,194 | 5/1989 | Bright et al. . |
| 4,842,922 | 6/1989 | Krupp et al. . |
| 4,857,251 | 8/1989 | Nohr et al. . |
| 4,861,652 | 8/1989 | Lippert et al. . |
| 4,863,779 | 9/1989 | Daponte . |
| 4,874,447 | 10/1989 | Hazelton et al. . |
| 4,879,170 | 11/1989 | Radwanski et al. . |
| 4,883,549 | 11/1989 | Frost et al. . |
| 4,891,957 | 1/1990 | Strack et al. . |
| 4,908,412 | 3/1990 | Otawa et al. . |
| 4,909,975 | 3/1990 | Sawyer et al. . |
| 4,923,742 | 5/1990 | Killian et al. . |
| 4,935,287 | 6/1990 | Johnson et al. . |
| 4,938,753 | 7/1990 | Van Gompel et al. . |
| 4,938,757 | 7/1990 | Van Gompel et al. . |

(List continued on next page.)

FOREIGN PATENT DOCUMENTS

| | | |
|---|---|---|
| 0546837A1 | 6/1993 | (EP) . |
| 2085073A1 | 6/1993 | (CA) . |
| 93/21242 | of 1993 | (WO) . |
| 9306168 | 4/1993 | (WO) . |
| WO 93/21242 A1 | 10/1993 | (WO) ........................... C08F/210/16 |
| 9412699 | 6/1994 | (WO) . |

\* cited by examiner

Primary Examiner—Fred Teskin

(57) ABSTRACT

Elastic fibers and fabrics made from homogeneously branched linear ethylene polymers are disclosed. The elastic fibers and fabrics can be used to produce structures that can have recycle compatibility between elastic and non elastic components. The novel fibers have at least about 50% recovery at 100% strain. The fibers and fabrics are especially useful in making fabricated articles and components thereof (e.g., disposable diapers).

9 Claims, No Drawings

U.S. PATENT DOCUMENTS

| | | |
|---|---|---|
| 4,939,016 | 7/1990 | Radwanski et al. . |
| 4,940,464 | 7/1990 | Van Gompel et al. . |
| 4,965,122 | 10/1990 | Morman . |
| 4,981,747 | 1/1991 | Morman . |
| 4,981,749 | 1/1991 | Kubo et al. . |
| 4,990,204 | 2/1991 | Krupp et al. . |
| 5,026,798 | 6/1991 | Canich ................................. 526/127 |
| 5,035,240 | 7/1991 | Braun et al. . |
| 5,036,551 | 8/1991 | Dailey et al. . |
| 5,037,416 | 8/1991 | Allen et al. . |
| 5,055,438 | 10/1991 | Canich ................................. 502/117 |
| 5,068,141 | 11/1991 | Kubo et al. . |
| 5,096,867 | 3/1992 | Canich ................................. 502/103 |
| 5,110,870 | 5/1992 | Fujii et al. . |
| 5,112,686 | 5/1992 | Krupp et al. . |
| 5,116,662 | 5/1992 | Morman . |
| 5,168,111 | 12/1992 | Canich ................................. 526/160 |
| 5,169,706 | 12/1992 | Collier, IV et al. . |
| 5,196,000 | 3/1993 | Clear et al. . |
| 5,264,405 | 11/1993 | Canich ................................. 502/103 |
| 5,272,236 * | 12/1993 | Lai et al. ........................ 526/348.5 |
| 5,278,272 * | 1/1994 | Lai et al. ........................ 526/348.5 |
| 5,322,728 * | 6/1994 | Davey et al. ....................... 428/296 |
| 5,324,576 | 6/1994 | Reed et al. . |

ELASTIC FIBERS

This application is a continuation of application Ser. No. 08/339,533, filed Nov. 15, 1994, now abandoned, which is a continuation of application Ser. No. 08/053,580, filed Apr. 27, 1993, now abandoned. This application is also a continuation-in-part of application Ser. No. 08/370,051 filed Jan. 9, 1995, now U.S. Pat. No. 5,525,695, which is a division of application Ser. No. 08/044,426, filed Apr. 7, 1993, now U.S. Pat. No. 5,380,810, which is a division of application Ser. No. 07/776,130, filed Oct. 15, 1991, now U.S. Pat. No. 5,272,236. This application is also a continuation-in-part of application Ser. No. 08/452,249, filed May 26, 1995, abandoned, which is a division of application Ser. No. 08/312,013, filed Sep. 23, 1994, abandoned, which is a file wrapper continuation of application Ser. No. 08/166,497, filed Dec. 13, 1993, abandoned, which is a division of application Ser. No. 07/ 939,281, filed Sep. 2, 1992, now U.S. Pat. No. 5,278,272, which is a continuation-in-part of application Ser. No. 07/776,130, filed Oct. 15, 1991, now U.S. Pat. No. 5,272,236.

FIELD OF THE INVENTION

This invention relates to elastic fibers, fabrics and articles fabricated therefrom (e.g., disposable incontinence garments or diapers). The fibers and fabrics comprise at least one homogeneously branched linear ethylene polymer having specific properties.

BACKGROUND OF THE INVENTION

Fiber is typically classified according to its diameter. Monofilament fiber is generally defined as having an individual fiber diameter greater than about 15 denier, usually greater than about 30 denier per filament. Fine denier fiber generally refers to a fiber having a diameter less than about 15 denier per filament. Microdenier fiber is generally defined as fiber having less than 100 microns diameter. The fiber can also be classified by the process by which it is made, such as monofilament, continuous wound fine filament, staple or short cut fiber, spun bond, and melt blown fiber.

A variety of fibers and fabrics have been made from thermoplastics, such as polypropylene, highly branched low density polyethylene (LDPE) made typically in a high pressure polymerization process, linear heterogeneously branched polyethylene (e.g., linear low density polyethylene made using Ziegler catalysis), blends of polypropylene and linear heterogeneously branched polyethylene, blends of linear heterogeneously branched polyethylene, and ethylene/vinyl alcohol copolymers.

Of the various polymers known to be extrudable into fiber, highly branched LDPE has not been successfully melt spun into fine denier fiber. Linear heterogeneously branched polyethylene has been made into monofilament, as described in U.S. Pat. No. 4,076,698 (Anderson et al.), the disclosure of which is incorporated herein by reference. Linear heterogeneously branched polyethylene has also been successfully made into fine denier fiber, as disclosed in U.S. Pat. No. 4,644,045 (Fowells), U.S. Pat. No. 4,830,907 (Sawyer et al.), U.S. Pat. No. 4,909,975 (Sawyer et al.) and in U.S. Pat. No. 4,578,414 (Sawyer et al.), the disclosures of which are incorporated herein by reference. Blends of such heterogeneously branched polyethylene have also been successfully made into fine denier fiber and fabrics, as disclosed in U.S. Pat. No. 4,842,922 (Krupp et al.), U.S. Pat. No. 4,990,204 (Krupp et al.) and U.S. Pat. No. 5,112,686 (Krupp et al.), the disclosures of which are all incorporated herein by reference. U.S. Pat. No. 5,068,141 (Kubo et al.) also discloses making nonwoven fabrics from continuous heat bonded filaments of certain heterogeneously branched LLDPE having specified heats of fusion.

However, fibers made from all of these types of saturated olefinic polymers are not "elastic" as that term is defined below without incorporating additives or elastomers, thus limiting their use in elastic applications. One attempt to alleviate this problem by incorporating additives into the polymer prior to melt spinning is disclosed in U.S. Pat. No. 4,663,220 (Wisneski et al.), the disclosure of which is incorporated herein by reference. Wisneski et al. disclose fibrous elastomeric webs comprising at least about 10 percent of a block copolymer and a polyolefin. The resultant webs are said to have elastomeric properties.

U.S. Pat. No. 4,425,393 (Benedyk) discloses monofilament fiber made from polymeric material having an elastic modulus from 2,000 to 10,000 psi. The polymeric material includes plasticized polyvinyl chloride (PVC), low density polyethylene (LDPE), thermoplastic rubber, ethylene-ethyl acrylate, ethylene-butylene copolymer, polybutylene and copolymers thereof, ethylene-propylene copolymers, chlorinated polypropylene, chlorinated polybutylene or mixtures of those.

Elastic fiber and web prepared from a blend of at least one elastomer (i.e., copolymers of an isoolefin and a conjugated polyolefin (e.g., copolymers of isobutylene and isoprene)) and at least one thermoplastic is disclosed in U.S. Pat. No. 4,874,447 (Hazelton et al.), the disclosure of which is incorporated herein by reference.

U.S. Pat. No. 4,657,802 (Morman), the disclosure of which is incorporated herein by reference, discloses composite nonwoven elastic webs and a process for their manufacture. The elastic materials useful for forming the fibrous nonwoven elastic web include polyester elastomeric materials, polyurethane elastomeric materials, and polyamide elastomeric materials.

U.S. Pat. No. 4,833,012 (Makimura et al.), the disclosure of which is incorporated herein by reference, discloses nonwoven entanglement fabrics made from a three dimensional entanglement of elastic fibers, nonshrinkable nonelastic fibers, and shrinkable elastic fibers. The elastic fibers are made from polymer diols, polyurethanes, polyester elastomers, polyamide elastomers and synthetic rubbers.

Composite elastomeric polyether block amide nonwoven webs are disclosed in U.S. Pat. No. 4,820,572 (Killian et al.), the disclosure of which is incorporated herein by reference. The webs are made using a melt blown process and the elastic fibers are made from a polyether block amide copolymer.

Another elastomeric fibrous web is disclosed in U.S. Pat. No. 4,803,117 (Daponte). Daponte discloses that the webs are made from elastomeric fibers or microfibers made from copolymers of ethylene and at least one vinyl monomer selected from the group including vinyl ester monomers, unsaturated aliphatic monocarboxylic acids and alkyl esters of these monocarboxylic acids. The amount of the vinyl monomer is said to be "sufficient" to impart elasticity to the melt- blown fibers. Blends of the ethylene/vinyl copolymers with other polymers (e.g., polypropylene or linear low density polyethylene) are also said to form the fibrous webs.

Fabricated articles, such as incontinence garments, also benefit from use of elastic components. For example, U.S. Pat. No. 4,940,464 (Van Gompel et al.), U.S. Pat. No. 4,938,757 (Van Gompel et al.), and U.S. Pat. No. 4,938,753

(Van Gompel et al.), the disclosures of which are incorporated herein by reference, discloses disposable garments containing elastic gathering means and stretchable side panels. The gathering means and stretchable side panels are made from melt blown or film of block or graft copolymers (e.g., butadiene, isoprene, styrene, ethylene-methyl acrylate, ethylene-vinyl acetate, ethylene-ethyl acrylate or blends thereof.

While previous efforts to make elastic fibers and fabrics from olefinic polymers have focused on polymer additives, these solutions have potential detriments, including the increased cost of the additives, and incompatibility, resulting in substandard spinning performance.

SUMMARY OF THE INVENTION

We have discovered new elastic fibers and fabrics which do not need additives to be elastic. These new fibers and fabrics can be produced on conventional synthetic fiber or fabric processes (e.g., continuous wound filament, spun bond, and melt blown) and they can be used to produce highly elastic structures that can have recycle compatibility between elastic and non-elastic components. These fibers and fabrics are made from homogeneously branched linear ethylene polymers.

The new elastic fiber has a permanent set of about 50% or less, or, stated another way, a percent recovery of at least about 50%. This property is surprisingly different than the response of fibers made from heterogeneously branched linear low density polyethylene where the percent permanent set seems to be generally greater than 50% and substantially independent of density. The fiber is made from at least one homogeneously branched linear ethylene polymer having a density less than about 0.90 g/cm³ and a molecular weight distribution, $M_w/M_n$, of from about 1.5 to about 2.5. The new elastic fabric comprises such elastic fibers.

DETAILED DESCRIPTION OF THE INVENTION

The homogeneously branched linear ethylene polymers useful herein to make the elastic fibers and fabrics are a known class of polymers which have a linear polymer backbone, no long chain branching and a narrow molecular weight distribution. Such polymers are interpolymers of ethylene and at least one α-olefin comonomer of from 3 to about 20 carbon atoms, and are preferably copolymers of ethylene with a $C_3$–$C_{20}$ α-olefin, and are most preferably copolymers of ethylene with 1-butene, 1-hexene, 4-methyl-1-pentene or 1-octene. This class of polymers is disclosed, for example, by Elston in U.S. Pat. No. 3,645,992 and subsequent processes to produce such polymers using metallocene catalysts have been developed, as shown, for example, in EP 0 129 368, EP 0 260 999, U.S. Pat. No. 4701432, U.S. Pat. No. 4937301, U.S. Pat. No. 4935397, U.S. Pat. No. 5,055,438, and WO 90/07526, and others. The polymers can be made by conventional polymerization processes (e.g., gas phase, slurry, solution, and high pressure).

The linear ethylene polymers used to form the elastic fibers have homogeneous branching distributions. The terms "homogeneously branching distribution" and "homogeneously branched" means that the comonomer is randomly distributed within a given molecule and that substantially all of the copolymer molecules have the same ethylene/comonomer ratio. The homogeneity of the branching distribution can be measured variously, including measuring the SCBDI (Short Chain Branch Distribution Index) or CDBI (Composition Distribution Branch Index). SCBDI or CDBI is defined as the weight percent of the polymer molecules having a comonomer content within 50 percent of the median total molar comonomer content. The CDBI of a polymer is readily calculated from data obtained from techniques known in the art, such as, for example, temperature rising elution fractionation (abbreviated herein as "TREF") as described, for example, in Wild et al, *Journal of Polymer Science, Poly. Phys. Ed.,* Vol. 20, p. 441 (1982), or in U.S. Pat. No. 4,798,081, both disclosures of which are incorporated herein by reference. The SCBDI or CDBI for the homogeneously branched polymers used in the present invention is preferably greater than about 30 percent, especially greater than about 50 percent.

The homogeneously branched linear ethylene polymers used to make the elastic fibers of the present invention have a single melting peak, as measured using differential scanning calorimetry (DSC), in contrast to heterogeneously branched linear ethylene polymers, which have 2 or more melting peaks, due to their broad branching distribution.

The density of the homogeneously branched linear ethylene polymers used to make the elastic fibers of the present invention is measured in accordance with ASTM D-792 and is generally less than about 0.90 g/cm³, preferably from about 0.85 g/cm³ to about 0.90 g/cm³, more preferably from about 0.85 g/cm³ to about 0.89 g/cm³, and especially from about 0.85 g/cm³ to about 0.88 g/cm³.

The molecular weight of the homogeneously branched linear ethylene polymers used to make the elastic fibers of the present invention is conveniently indicated using a melt index measurement according to ASTM D-1238, Condition 190° C/2.16 kg (formally known as "Condition (E)" and also known as $I_2$). Melt index is inversely proportional to the molecular weight of the polymer. Thus, the higher the molecular weight, the lower the melt index, although the relationship is not linear. The melt index for the homogeneously branched linear ethylene polymers used to make the elastic fibers used herein is generally from about 0.01 grams/10 minutes (g/10 min) to about 1000 g/10 min, preferably from about 0.1 gi10 min to about 5 g/10 min for monofilament (fibers generally above about 15 denier/filament), and preferably from about 5 g/10 min to about 250 g/10 min for fine denier fibers (fibers having a diameter generally less than or equal to 15 denier/filament).

Another measurement useful in characterizing the molecular weight of the homogeneously branched linear ethylene polymers used to make the elastic fibers is conveniently indicated using a melt index measurement according to ASTM D-1238, Condition 190° C./10 kg (formerly known as "Condition (N)" and also known as $I_{10}$). The ratio of these two melt index terms is the melt flow ratio and is designated as I10/I₂. Generally, the $I_{10}/I_2$ ratio of the homogeneously branched linear ethylene polymers is about 6 or less.

Additives such as antioxidants (e.g., hindered phenolics (e.g., Irganox® 1010 made by Ciba-Geigy Corp.), phosphites (e.g., Irgafos® 168 made by Ciba-Geigy Corp.)), cling additives (e.g., polyisobutylene (PIB)), antiblock additives, pigments, and the like can also be included in the homogeneously branched linear ethylene polymers used to make the elastic fibers, to the extent that they do not interfere with the enhanced fiber and fabric properties discovered by Applicants.

Molecular Weight Distribution Determination

The molecular weight distribution ($M_w/M_n$) of the homogeneously branched ethylene interpolymers are analyzed by gel permeation chromatography (GPC) on a Waters 150C high temperature chromatographic unit equipped with three mixed porosity columns (Polymer Laboratories $10^3$, $10^4$, $10^5$, and $10^6$), operating at a system temperature of 140° C. The solvent is 1,2,4-trichlorobenzene, from which 0.3 percent by weight solutions of the samples are prepared for injection. The flow rate is 1.0 milliliters/minute and the injection size is 200 microliters.

The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Word in *Journal of Polymer Science, Polymer Letters*, Vol. 6, (621) 1968, incorporated herein by reference) to derive the following equation:

$$M_{polyethylene} = a*(M_{polystyrene})^b.$$

In this equation, a=0.4316 and b=1.0. Weight average molecular weight, $M_w$, is calculated in the usual manner according to the following formula: $M_w = \Sigma w_i * M_i$, where $w_i$ and $M_i$ are the weight fraction and molecular weight, respectively, of the $i^{th}$ fraction eluting from the GPC column.

The $M_w/M_n$ of the homogeneously branched linear ethylene polymers is generally from about 1.5 to about 2.5.

The term "homogeneously branched linear ethylene polymers" as used herein does not include, by definition, the traditional heterogeneously branched linear low density polyethylenes of linear high density polyethylenes made using Ziegler polymerization processes (e.g., U.S. Pat. No. 4,076,698 (Anderson et al.), the disclosure of which is incorporated herein by reference) or the linear homogeneously branched polymers described by Elston (U.S. Pat. No. 4,645,992, the disclosure of which is incorporated herein by reference) which have a density of 0.915 g/cm³ or higher, or the branched high pressure polyethylenes and other high pressure ethylene copolymers (e.g., ethylene/vinyl acetate or ethylene/vinyl alcohol copolymers) which are known to those skilled in the art to have numerous long chain branches.

Fibers and/or Fabric

The fibers claimed herein are elastic. The term "elastic" means that the fiber will recover at least about 50 percent of its stretched length after the first pull and after the fourth pull to 100% strain (doubled the length). Elasticity can also be described by the "permanent set" of the fiber. Permanent set is the converse of elasticity. A fiber is stretched to a certain point and subsequently released to the original position before stretch, and then stretched again. The point at which the fiber begins to pull a load is designated as the percent permanent set.

For the homogeneously branched linear ethylene polymers used herein, the percent permanent set correlates with the density of the polymer selected. Generally, the lower the density, the lower the permanent set. For fibers made from a homogeneously branched linear ethylene/α-olefin polymer having a density less than about 0.90 g/cm³, the percent permanent set is less than or equal to about 50% (i.e., the recovery is at least about 50%).

Various homofil fibers can be made from the novel homogeneously branched linear ethylene polymers. Homofil fibers are those fibers which have a single region (domain) and do not have other distinct polymer regions (as do bicomponent fibers). These homofil fibers include staple fibers, spunbond fibers or melt blown fibers (using, e.g., systems as disclosed in U.S. Pat. No. 4,340,563 (Appel et al.), U.S. Pat. No. 4,663,220 (Wineski et al.), U.S. Pat. No. 4,668,566 (Braun), or U.S. Pat. No. 4,322,027 (Reba), all of which are incorporated herein by reference), and gel spun fibers (e.g., the system disclosed in U.S. Pat. No. 4,413,110, incorporated herein by reference)). Staple fibers can be melt spun (i.e., they can be extruded into the final fiber diameter directly without additional drawing), or they can be melt spun into a higher diameter and subsequently hot or cold drawn to the desired diameter using conventional fiber drawing techniques. The novel elastic staple fibers disclosed herein can also be used as bonding fibers, especially where the novel elastic fibers have a lower melting point than the surrounding matrix fibers. In a bonding fiber application, the bonding fiber is typically blended with other matrix fibers and the entire structure is subjected to heat, where the bonding fiber melts and bonds the surrounding matrix fiber. Typical matrix fibers which benefit from use of the novel elastic fibers includes, but is not limited to: poly(ethylene terephthalate) fibers; cotton fibers; nylon fibers; polypropylene fibers; other heterogeneously branched polyethylene fibers; and linear polyethylene homopolymer fibers. The diameter of the matrix fiber can vary depending upon the end use application illustrated.

For the novel elastic fibers disclosed herein, the melt index can be widely varied, with surprisingly little impact upon the fibers' elasticity. This allows more design flexibility for fabrics and finished articles because the strength and refractive force of the fibers and fabrics can be changed independently of the elasticity. For example, the refractive force of a fiber can be changed by changing the polymer melt index (decreasing the melt index increases the retractive force), rather than the fiber diameter, thus permitting a better optimization of fabric "hand" (i.e., feel) with the necessary elastic/strength fabric performance.

Bicomponent fibers can also be made from the homogeneously branched linear ethylene polymers. Such bicomponent fibers have the homogeneously branched linear ethylene polymer in at least one portion of the fiber. For example, in a sheath/core bicomponent fiber (i.e., one in which the sheath concentrically surrounds the core), the homogeneously branched linear ethylene polymer can be in either the sheath or the core. Different homogeneously branched linear ethylene polymers can also be used independently as the sheath and the core in the same fiber preferably where both components are elastic and especially where the sheath component has a lower melting point than the core component. Other types of bicomponent fibers are within the scope of the invention as well, and include such structures as side-by-side fibers (e.g., fibers having separate regions of polymers, wherein the homogeneously branched linear ethylene polymer comprises at least a portion of the fiber's surface).

The shape of the fiber is not limited. For example, typical fiber have a circular cross sectional shape, but sometimes fibers have different shapes, such as a trilobal shape, or a flat (i.e., "ribbon" like) shape. The elastic fiber disclosed herein is not limited by the shape of the fiber.

Fiber diameter can be measured and reported in a variety of fashions. Generally, fiber diameter is measured in denier per filament. Denier is a textile term which is defined as the grams of the fiber per 9000 meters of that fiber's length. Monofilament generally refers to an extruded strand having a denier per filament greater than 15, usually greater than 30. Fine denier fiber generally refers to fiber having a denier of about 15 or less. Microdenier (aka microfiber) generally refers to fiber having a diameter not greater than about 100 micrometers. For the novel elastic fibers disclosed herein, the diameter can be widely varied, with little impact upon the fiber's elasticity. However, the fiber denier can be adjusted to suit the capabilities of the finished article and as such, would preferably be: from about 0.5 to about 30 denier/filament for melt blown; from about 1 to about 30 denier/filament for spunbond; and from about 1 to about 20,000 denier/filament for continuous wound filament.

Fabrics made from such novel fibers include both woven and nonwoven fabrics. Nonwoven fabrics can be made variously, including spunlaced (or hydrodynamically entangled) fabrics as disclosed in U.S. Pat. No. 3,485,706 (Evans) and U.S. Pat. No. 4,939,016 (Radwanski et al.), the disclosures of which are incorporated herein by reference; by carding and thermally bonding staple fibers; by spunbonding continuous fibers in one continuous operation; or by melt blowing fibers into fabric and subsequently calandering or thermally bonding the resultant web. These various nonwoven fabric manufacturing techniques are well known to those skilled in the art and the disclosure is not limited to any particular method. Other structures made from such fibers are also included within the scope of the invention, including e.g., blends of these novel fibers with other fibers (e.g., poly(ethylene terephthalate) (PET) or cotton).

As used in the claims herein, the term "consisting essentially of" means that both the homogeneously branched linear ethylene/a-olefin polymers used to make the fibers and fabrics can have additional materials which do not materially affect the elasticity of the fibers or fabric. Such useful nonlimiting additive materials include pigments, antioxidants, stabilizers, surfactants (e.g., as disclosed in U.S. Pat. No. 4,486,552 (Niemann), U.S. Pat. No. 4,578,414 (Sawyer et al.) or U.S. Pat. No. 4,835,194 (Bright et al.), the disclosures of all of which are incorporated herein by reference).

Fabricated Articles

Fabricated articles which can be made using the novel elastic fibers and fabrics disclosed herein include composite fabric articles (e.g., diapers) that desire elastic portions. For example, elastic portions are desired in diaper waist band portions to prevent the diaper from falling and leg band portions to prevent leakage (as shown in U.S. Pat. No. 4,381,781 (Sciaraffa), the disclosure of which is incorporated herein by reference). Often, the elastic portions promote better form fitting and/or fastening systems for a good combination of comfort and reliability. The novel elastic fibers and fabrics disclosed herein can also produce structures which combine elasticity with breathability.

The novel elastic fibers and fabrics disclosed herein can also be used in various structures as described in U.S. Pat. No. 2,957,512 (Wade), the disclosure of which is incorporated herein by reference. For example, layer 50 of the structure described in U.S. Pat No. '512 (i.e, the elastic component) can be replaced with the novel elastic fibers and fabrics, especially where flat, pleated, creped, etc., non-elastic materials are made into elastic structures. Attachment of the novel elastic fibers and/or fabric to non-elastic fibers, fabrics or other structures can be done with melt bonding or with adhesives. Gathered or shirred elastic structures can be produced from the new elastic fibers and/or fabrics and non-elastic components by pleating the non-elastic component (as described in U.S. Pat. No. '512) prior to attachment, prestretching the elastic component prior to attachment, or heat shrinking the elastic component after attachment.

The novel elastic fibers described herein also can be used in a spunlaced (or hydrodynamically entangled) process to make novel structures. For example, U.S. Pat. No. 4,801,482 (Goggans), the disclosure of which is incorporated herein by reference, discloses an elastic sheet (12) which can now be made with the novel elastic fibers/fabric described herein.

Continuous elastic filaments as described herein could also be used in woven applications where high resilience is desired.

The novel elastic fibers and fabrics disclosed herein also have adjustable tenacity and retractive force, which enables design flexibility for variable retractive force in the same garment, if needed, as described for example in U.S. Pat. No. 5,196,000 (Clear et al.), the disclosure of which is incorporated herein by reference.

U.S. Pat. No. 5,037,416 (Allen et al.), the disclosure of which is incorporated herein by reference, describes the advantages of a form fitting top sheet by using elastic ribbons (see member 19 of U.S. Pat. No. +416). The novel elastic fibers could serve the function of member 19 of U.S. Pat. No. '416, or could be used in fabric form to provide the desired elasticity.

Composites that utilize very high molecular weight linear polyethylene or copolymer polyethylene also benefit from the novel elastic fibers disclosed herein. For example, the novel elastic fibers have a low melting point (with the melting point of the polymer essentially linearly related to the polymer density), such that in a blend of novel elastic fibers and very high molecular weight polyethylene fibers (e.g., Spectra™ fibers made by Allied Chemical) as described in U.S. Pat. No. 4,584,347 (Harpell et al.), the disclosure of which is incorporated herein by reference, the lower melting elastic fibers bond the high molecular weight polyethylene fibers without melting the high molecular weight fibers, thus preserving the high strength and integrity of the high molecular weight fiber.

In U.S. Pat. No. 4,981,747 (Morman), the novel elastic fibers and/or fabrics disclosed herein can be substituted for elastic sheet 122, which forms a composite elastic material including a reversibly necked material.

The new elastic fibers can also be a melt blown elastic component, as described in reference 6 of the drawings of U.S. Pat. No. 4,879,170 (Radwanski), the disclosure of which is incorporated herein by reference. U.S. Pat. No. '170 generally describes elastic coform material and manufacturing processes.

Elastic panels can also be made from the novel elastic fibers and fabrics disclosed herein, and can be used, for example, as members 18, 20, 14, and/or 26 of U.S. Pat. No. 4,940,464 (Van Gompel), the disclosure of which is incorporated herein by reference. The novel elastic fibers and fabrics described herein can also be used as elastic components of composite side panels (e.g., layer 86 of U.S. Pat. No. '464).

Experimental

Fibers are produced by extruding the polymer using a one inch diameter extruder which feeds a gear pump. The gear pump pushes the material through a spin pack containing a 40 micrometer (average pore size) sintered flat metal filter and a 34 hole spinneret. The spinneret holes have a diameter of 400 micrometers and a land length (i.e, length/diameter or L/D) of 4/1. The gear pump is operated such that about 0.39 grams of polymer are extruded through each hole of the spinneret per minute. Melt temperature of the polymer is typically about 204° C., but varies depending upon the molecular weight of the polymer being spun. Generally the higher the molecular weight, the higher the melt temperature. Quench air (slightly above room temperature (about 25 C) is used to help the melt spun fibers cool. The quench air is located just below the spinneret and blows air across the fiber line as it is extruded. The quench air flow rate is low enough so that it can barely be felt by hand in the fiber area below the spinneret. The fibers are collected on a godet roll having a diameter of about 6 inches (15.24 cm). The godet roll speed is adjustable, but for the experiments demonstrated herein, the godet speed is about 1500 revolutions/minute. The godet roll is located about 3 meters below the spinneret die.

Fibers are tested on an Instron tensile testing device equipped with a small plastic jaw on the cross-head (the jaw has a weight of about six gms) and a 500 gram load cell. The jaws are set 1 inch (2.54 cm) apart. The cross head speed is set at 5 inches/minute (12.7 cm/minute). A single fiber is loaded into the Instron jaws for testing. The fiber is then stretched to 100% of strain (i.e., it is stretched another 1 inch), where the tenacity is recorded. The fiber is allowed to return to the original Instron setting (where the jaws are again 1 inch apart) and the fiber is again pulled. At the point where the fiber begins to provide stress resistance, the strain is recorded and the percent permanent set is calculated. In one example, a fiber pulled for the second time did not provide stress resistance (i.e., pull a load) until it had traveled 0.1 inches (0.25 cm). Thus, the percent permanent set is calculated as 10%, i.e., the percent of strain at which the fiber begins to provide stress resistance. The numerical difference between the percent permanent set and 100% is known as the percent elastic recovery. Thus, a fiber having a permanent set of 10% will have a 90% elastic recovery. After recording percent permanent set, the fiber is pulled to 100% strain and the tenacity recorded. The fiber pulling process is repeated several times, with the percent permanent set recorded each time and the 100% strain tenacity recorded as well. Finally, the fiber is pulled to its breaking point and the ultimate breaking tenacity and elongation are recorded.

EXAMPLES 1 AND 2 AND COMPARATIVE EXAMPLES 3–12

Example 1 is made from a homogeneously branched ethylene/butene copolymer trademarked TAFMER™ A20090, which is made by Mitsui Petrochemical.

Example 2 is made from a homogeneously branched ethylene/butene copolymer trademarked EXACT™ 4023, which is made by Exxon Chemical Corporation.

Table 1 summarizes percent permanent set data for melt spun (i.e., no further mechanical drawing) fiber for Examples 1 and 2. The percent permanent set is obtained by pulling each fiber to 100% strain five times, at which point the percent permanent set is recorded as described earlier in this disclosure.

TABLE 1

| Ex. | $I_2$ (g/10 min) | Density (g/cm³) | $I_{10}/I_2$ | Denier (avg.) | $M_w/M_n$ | Perm. Set* (%) | Perm. Set** (%) |
|---|---|---|---|---|---|---|---|
| 1 | 18 | 0.895 | 5 | 5.1 | 1.80 | 36 | 49 |
| 2 | 35 | 0.882 | 5.6 | 5.1 | 2.05 | 13 | 19 |

*After the 1st pull
**After the 4th pull
NM = Not Measured

Examples 1 and 2 are easily made into fiber and have less permanent set (more resiliency) than comparable examples 3–7. The lower density example 2 has elastic properties rivaling that of comparative examples 8–11, which are currently used commercially, either alone or in combination with traditional non-elastic polymers (e.g., polypropylene or heterogeneously branched linear ethylene polymers).

Comparative Examples 3–7 are fibers melt spun from conventional heterogeneously branched ethylene/1-octene polymers (such as DOWLEX® polyethylene and ASPUN® Fiber Grade Resins, both made by The Dow Chemical Company).

Comparative Example 8 is a set of rubber fibers/strips made by JPS Corp.

Comparative example 9 is Lycra™ fiber (made by DuPont).

Comparative examples 10, 11 and 12 are elastic components from Huggies™ Pull Ups diapers (made by Kimberly Clark Corp.). After the polypropylene fabric is stripped off of the elastic side panel, a set of thin strips are cut from the elastic side panels of the diapers and tested as comparable example 10 to simulate performance of individual fibers.

The elastic fibers from the waist band of the diapers are identified as polyurethane (by infrared) and are tested as comparative example 11.

Fabric cut from the stripped elastic side panel is designated comparative example 12 and has a basis weight of about 0.64–0.69 grams/square inch. Comparative example 12 is tested in accordance with the method used for testing the fibers (but by using a one inch by one inch square piece of fabric) and has a percent permanent set of about 2% after the first pull and a percent permanent set of about 3% after the fourth pull.

Table 2 summarizes data obtained for fiber of Comparative Examples 3–11:

TABLE 2

| Comp. Ex. | $I_2$ (g/10 min) | Density (g/cm³) | $I_{10}/I_2$ | Denier (avg.) | $M_w/M_n$ | Perm. Set* (%) | Perm. Set** (%) |
|---|---|---|---|---|---|---|---|
| 3 | 17 | 0.95 | 6.5 | 4.8 | 2.63 | 61 | 70 |
| 4 | 34 | 0.9406 | 6.6 | 4.5 | 2.71 | 53 | 61 |
| 5 | 18 | 0.93 | 7 | 5.3 | 2.73 | 53 | 62 |
| 6 | 6 | 0.9124 | 7.6 | 4.2 | 3.47 | 54 | 64 |
| 7 | 3.8 | 0.8904 | 8.8 | 4.8 | 3.7 | 62 | 70 |
| 8 | NA | NA | NA | 2100 | NA | 5 | 8 |
| 9 | NA | NA | NA | 1900 | NA | 5 | 5 |
| 10 | NA | NA | NA | NM | NA | 2 | 4 |
| 11 | NA | NA | NA | 1000 | NA | 4 | 9 |

*After the 1st pull
**After the 4th pull
NA = Not Applicable
NM = Not Measured

We claim:

1. An elastic fiber having a percent recovery of at least about 50 percent consisting essentially of at least one homogeneously branched linear ethylene polymer characterized as having:

a) a density less than about 0.90 g/cm³, and b) a molecular weight distribution, $M_w/M_n$, from about 1.5 to about 2.5.

2. The elastic fiber of claim 1 wherein the homogeneously branched linear ethylene polymer is an interpolymer of ethylene with at least one $C_3$–$C_{20}$ α-olefin.

3. The elastic fiber of claim 1 wherein the homogeneously branched linear ethylene polymer is a copolymer of ethylene with at least one $C_3$–$C_{20}$ α-olefin.

4. The elastic fiber of claim 1 wherein the homogeneously branched linear ethylene polymer is a copolymer of ethylene and with 1-butene, 1-hexene, 4-methyl-1-pentene or 1-octene.

5. The elastic fiber of claim 4 wherein the homogeneously branched linear ethylene polymer is a copolymer of ethylene and 1-butene.

6. The elastic fiber of claim 5 where the density is from about 0.85 to about 0.89 g/cm$^3$.

7. An elastic fiber having a percent recovery of at least about 50 percent comprising at least one copolymer of ethylene and at least one comonomer, the polymer having a density less than about 0.90 g/cm$^3$, a MWD in the range of about 1.5 to about 2.5, a melt index in the range of about 0.01 grams/10 minutes to about 1000 grams/10 minutes, and a CDBI of greater than about 30%.

8. The elastic fiber of claim 7 wherein the copolymer is a homogeneously branched linear ethylene polymer.

9. The elastic fiber of claim 7 wherein the CDBI is greater than about 50%.

* * * * *